United States Patent [19]

Aida et al.

[11] Patent Number: 5,083,874
[45] Date of Patent: Jan. 28, 1992

[54] OPTICAL REPEATER AND OPTICAL NETWORK USING THE SAME

[75] Inventors: Kazuo Aida, Yokohama; Shigendo Nishi; Masatoshi Saruwatari, both of Yokosuka; Kiyoshi Nakagawa, Kanagawa, all of Japan

[73] Assignee: Nippon Telegraph and Telephone Corporation, Tokyo, Japan

[21] Appl. No.: 506,906

[22] Filed: Apr. 10, 1990

[30] Foreign Application Priority Data

Apr. 14, 1989 [JP] Japan ..................................... 1-94579
Apr. 24, 1989 [JP] Japan ................................... 1-104008

[51] Int. Cl.$^5$ ............................................. G02B 6/28
[52] U.S. Cl. ..................................... 385/24; 455/601; 455/606; 359/174; 359/154
[58] Field of Search ........................... 350/96.16, 96.23; 455/601, 606; 372/6, 39

[56] References Cited

U.S. PATENT DOCUMENTS

| | | | |
|---|---|---|---|
| 3,729,690 | 4/1973 | Snitzer | 372/6 X |
| 4,546,476 | 10/1985 | Shaw et al. | 372/69 X |
| 4,699,452 | 10/1987 | Mollenauer et al. | 350/96.16 |
| 4,790,619 | 12/1988 | Lines et al. | 350/96.16 |

FOREIGN PATENT DOCUMENTS

| | | |
|---|---|---|
| 0146262 | 6/1985 | European Pat. Off. . |
| 0221711 | 5/1987 | European Pat. Off. . |
| 0268523 | 5/1988 | European Pat. Off. . |

*Primary Examiner*—John D. Lee
*Assistant Examiner*—Stephen W. Barns
*Attorney, Agent, or Firm*—Pollock, Vande Sande and Priddy

[57] ABSTRACT

At least one optical repeater is connected in series to an optical signal transmission fiber of an optical fiber cable interconnecting transmitting and receiving terminals, and the optical repeater has an optical amplifier which is excited by pump light to amplify signal light. The pump light is supplied from the outside of the optical repeater, and the pump light supplied is input into the optical amplifier via at least one of its input end and output end. The optical repeater may include an optical divider for dividing the pump light supplied thereto into two, which are input into the optical amplifier via its input end and output end, respectively.

23 Claims, 10 Drawing Sheets

FIG. 23
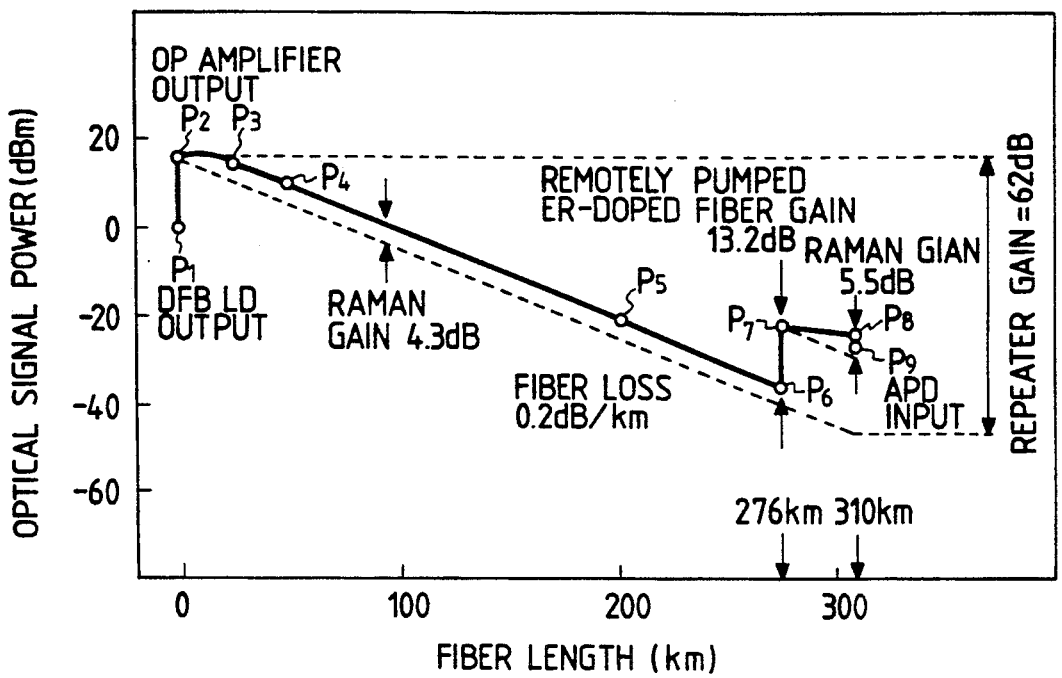
FIG. 24
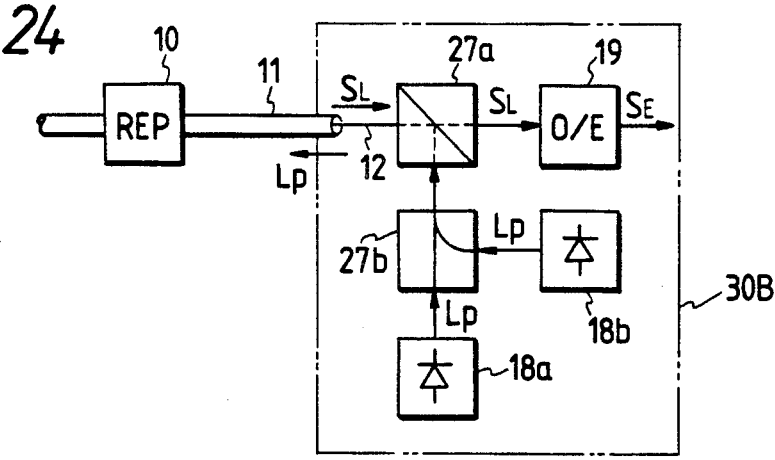
FIG. 25

OPTICAL REPEATER AND OPTICAL NETWORK USING THE SAME

BACKGROUND OF THE INVENTION

The present invention relates to an optical repeater which is used in an optical network, for amplifying an optical signal being transmitted, and an optical network using an optical repeater.

A conventional submarine repeatered transmission network employing a submarine optical fiber cable, for example, requires a submarine optical repeater which amplifies an attenuated optical signal for long distance transmission. FIG. 1 is a block diagram showing the constitution of the submarine optical repeater for use in the conventional optical network.

In FIG. 1 a submarine optical cable 51 comprises an optical fiber 52 for transmitting an optical signal and a feed line 57 for supplying power necessary for repeater processing. A submarine optical repeater 50 which is inserted in the submarine optical cable 51 at predetermined intervals comprises an optical/electrical converter 53 for converting the optical signal into an electrical signal, an amplifier 55 for amplifying the electrical signal, an electrical/optical converter 54 for converting the amplified electrical signal into an optical signal for input into the optical fiber 52, and a power circuit 56 for supplying power to the converters 53 and 54, and the amplifier 55.

Thus, the submarine optical repeater 50 of the conventional optical network has an arrangement in which an attenuated optical signal is converted into an electrical signal, which is amplified and is then converted again into an optical signal for output at a high signal level.

In such a submarine optical repeater 50 it is necessary for the amplification of the optical signal to supply an appreciable amount of power to each circuit. This inevitably calls for the use of a feed line of an excellent insulating property, for instance, from a power feed unit on land to the submarine optical repeater 50.

Moreover, the submarine optical repeater 50 must be highly reliable for its long-term, maintenance-free operation. However, since each circuit of the conventional submarine optical repeater 50 includes many parts involving semiconductor devices, the individual parts must be made very highly reliable for obtaining the required reliability—this inevitably makes the submarine optical repeater 50 expensive and hence increases the manufacturing costs of the entire optical network.

SUMMARY OF THE INVENTION

It is therefore an object of the present invention to provide a low-cost optical network which is free from the necessity of power supply to optical repeaters but capable of long-term, maintenance-free operation and an optical repeater for use in such an optical network.

The optical network of the present invention includes: an optical cable including an optical fiber for transmitting signal light of a predetermined wavelength between at least two terminals; at least one repeater means inserted in series into the optical fiber between the two terminals; and pump light supply means for supplying pump light to the repeater means. The repeater means includes: an optical amplifying element which has an input end for receiving the signal light and an output end for outputting the signal light after its amplification and is excited by the pump light to amplify the signal light; input coupling means for optically coupling the optical signal transmission fiber and the input end of the optical amplifying element and for applying the signal light from the optical signal transmission fiber into the optical amplifying element; output coupling means for optically coupling the optical signal transmission fiber and the output end of the optical amplifying element and for outputting the amplified optical signal from the optical amplifying element to the optical signal transmission fiber; and pump light input means for inputting the pump light from the pump light supply means to at least one of the input and output ends of the optical amplifying element.

With such an optical network of the present invention, the repeater means amplifies the input optical signal directly by the optical amplifying element excited by the pump light and the pump light is applied to the repeater means from the outside. Hence, no electrical power needs to be supplied to the repeater means. Thus, the optical network of the present invention is operable for a long term without the necessity of maintenance.

BRIEF DESCRIPTION OF THE DRAWINGS

FIG. 23 is a graph showing measured signal light levels at predetermined points in the experimental optical network depicted in FIG. 22;

FIG. 24 is a block diagram showing another example of a pumping light source;

FIG. 25 is a block diagram showing another example of the optical repeater of the present invention;

DETAILED DESCRIPTION OF THE PREFERRED EMBODIMENTS

Figure 1:
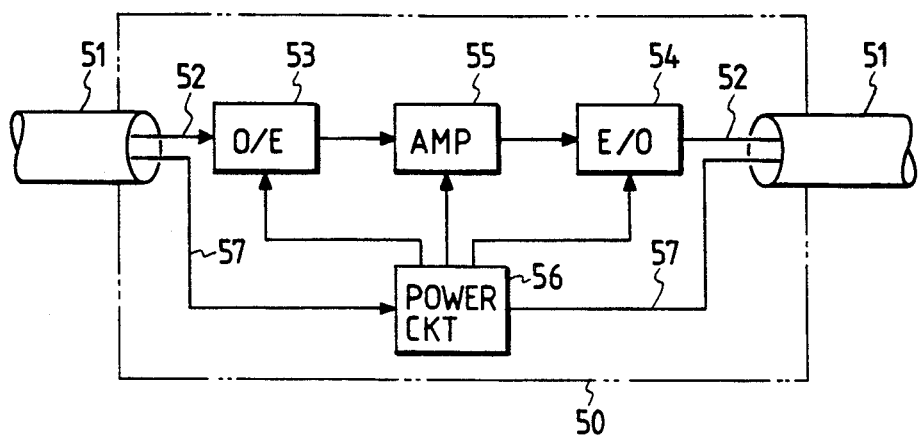
FIG. 1 is a block diagram showing a conventional optical network.
Figure 2:
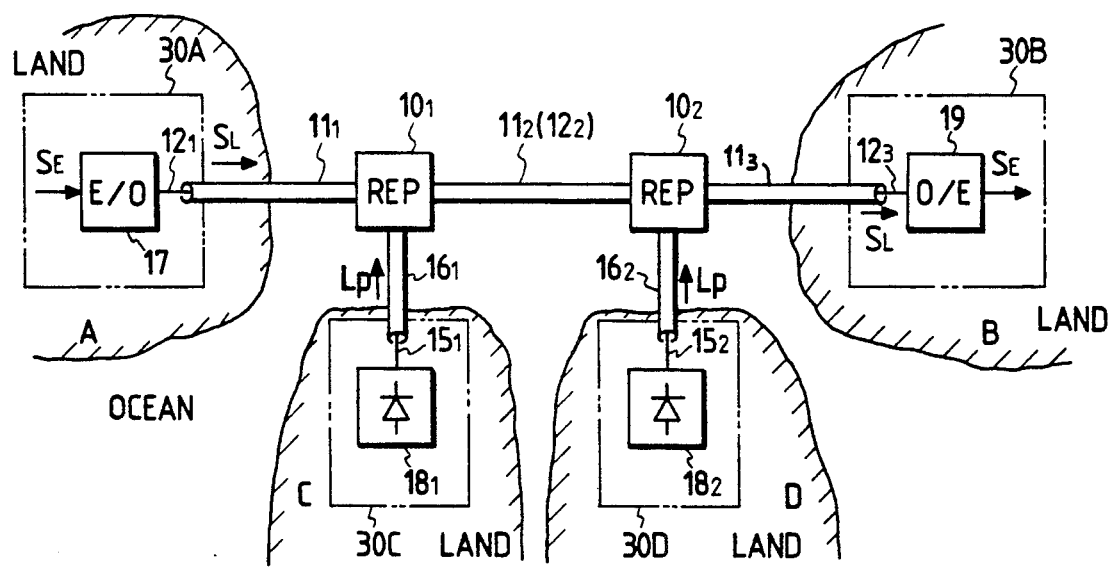
FIG. 2 is a block diagram illustrating a first embodiment of the optical network of the present invention.

FIG. 2 illustrates in block form an embodiment of the optical network of the present invention. A transmitting terminal 30A at a location A and a receiving terminal 30B at a location B are connected by optical fiber cables $11_1$, $11_2$ and $11_3$ via optical repeaters $10_1$ and $10_2$ inserted in series, and these optical fiber cables have optical signal transmission fibers $12_1$, $12_2$ and $12_3$, respectively. Further, units of support equipment 30C and 30D are provided at different locations C and D and are connected to the optical repeaters $10_1$ and $10_2$ via pump light transmission cables $16_1$ and $16_2$, respectively. The support equipments 30C and 30D supply pump light $L_P$ from pump light sources $18_1$ and $18_2$ to the optical repeaters $10_1$ and $10_2$ via optical fibers $15_1$ and $15_2$ of the pump light transmission cables $16_1$ and $16_2$.

For example, the transmitting terminal 30A provides signal light $S_L$ from an optical transmitter 17 to the optical fiber $12_1$ of the optical fiber cable $11_1$ through which the signal light $S_L$ is transmitted to the optical repeater $10_1$. The optical repeater $10_1$ directly amplifies and provides the signal light $S_L$ to the optical fiber $12_2$ of the optical fiber cable $11_2$. The optical repeater $10_2$ identical in construction with the optical repeater $10_1$ directly amplifies the received signal light $S_L$ and then provides it on the optical fiber $12_3$ of the optical fiber cable $11_3$. The receiving terminal 30B converts the received signal light $S_L$ by a photodetector unit 19 into an electrical signal $S_E$.

Figure 3:
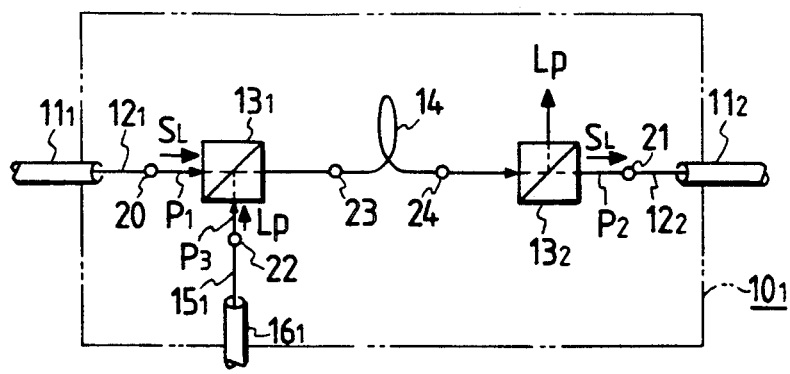
FIG. 3 is a block diagram showing an example of an optical repeater for use in the optical network depicted in FIG. 2.

FIG. 3 shows an embodiment of each of the optical repeaters $10_1$ and $10_2$ for use in the FIG. 2 embodiment. The illustrated optical repeater is shown to be used as the optical repeater $10_1$. The optical repeater $10_1$ has an optical signal input terminal 20, an optical signal output terminal 21 and a pump light input terminal 22, and an optical amplifying element 14 is disposed between the optical signal input terminal 20 and the optical signal output terminal 21. The optical signal input terminal 20, the optical signal output terminal 21 and the pump light input terminal 22 define the signal light and pump light input terminals and the output terminal of an optical system forming the optical repeater $10_1$, and they are also the terminating end and the starting end of the optical signal transmission fibers $12_1$ and $12_2$ and the terminating end of a pump light transmission fiber $15_1$. A coupler $13_1$ is provided in an optical path $P_1$ between the optical signal input terminal 20 and the input end 23 of the optical amplifying element 14, and a splitter $13_2$ is provided in an optical path $P_2$ between the output end 24 of the optical amplifying element 14 and the optical signal output terminal 21. In this optical repeater the signal light $S_L$ emitted from the optical signal transmission fiber $12_1$ of the optical fiber cable $11_1$ connected to the optical signal input terminal 20 is applied therefrom via the optical path $P_1$ to the input end 23 of the optical amplifying element 14. The signal light $S_L$ is amplified as it propagates through the optical amplifying element 14 excited by the pump light $L_P$, and the signal light $S_L$ thus amplified is emitted from the output end 24 of the optical amplifying element 14, thereafter being provided via the optical path $P_2$ to the optical fiber $12_2$ of the optical fiber cable $11_2$ connected to the optical signal output terminal 21.

On the other hand, the pump light $L_P$ which is emitted from the optical fiber $15_1$ of the pump light supply optical fiber cable $16_1$ at the pump light input terminal 22 is wavelength multiplexed with the signal light $S_L$ by the coupler $13_1$ disposed in the optical path $P_1$ and thereafter is applied to the input end 23 of the optical amplifying element 14. In other words, the signal light $S_L$ and the pump light $L_P$ are input into the optical amplifying element 14 in the same direction, by which the optical amplifying element 14 is excited. This method of excitation is called a forward excitation. In the optical amplifying element 14 the pump light $L_P$ is consumed by excitation of the optical amplifying element 14 and the excess pump light is emitted from the output end 24. In this example the excess pump light is removed from the optical path $P_2$ by the splitter $13_2$ provided therein, but it is also possible to apply both the excess pump light and the signal light $S_L$ to the optical signal transmission fiber $12_2$ connected to the signal output terminal 21 without providing the splitter $13_2$. The coupler $13_1$ and the splitter $13_2$ may be formed by, for example, dichroic mirrors or fiber couplers of the same characteristic which pass therethrough the signal light $S_L$ but reflect the pump light $L_P$. The coupler $13_1$ may be a directional optical coupler.

In FIG. 3 the optical amplifying element 14 can be formed by, for instance, an Erbium-doped silica fiber several tens of meters to one hundred meters in length. In this case, the wavelength suitable as the pump light is in the range of 1.46 to 1.49 μm. It is well-known in the art that the fiber excited by pump light in that wavelength range presents an amplification characteristic wherein the gain for light passing through the fiber becomes maximum at wavelengths of 1.535 and 1.55 μm (see OFC'89 POSTDEADLINE PAPER THURSDAY, FEBRUARY, 1983, PD15, "A 212 km NON-REPEATED Er-3 DOPED FIBER AMPLIFIERS IN AN IN/DETECTION REPEATER SYSTEM", K. HAGIMOTO et al, for example). Accordingly, in the embodiment shown in FIG. 2, the optical transmitter 17 delivers the signal light $S_L$ of a 1.55 μm wavelength, for instance, and the pump light sources $18_1$ and $18_2$ each deliver pump light of a 1.48 μm wavelength, for example. Of course, light of the 1.535 μm wavelength can also be used as the signal light. By using fibers doped with rare earth elements other than the erbium, pump light and signal light of other wavelengths can be employed. In general, the wavelength of the pump light is shorter than the wavelength of the signal light.

Figure 4:
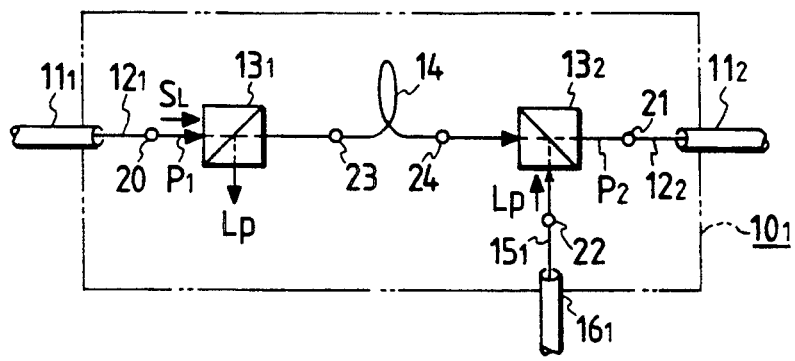
FIG. 4 is a block diagram showing another example of the optical repeater.

While in FIG. 3 the pump light $L_P$ is shown to be incident to the optical amplifying element 14 at the input end 23 thereof, the optical repeater may also be arranged so that the pump light $L_P$ is reflected by a coupler $13_2$ for incidence to the optical amplifying element 14 via the output end 24 thereof in a direction opposite from the signal light $S_L$ as shown in FIG. 4. This excitation method is called a reverse excitation. Also in this instance, the splitter $13_1$ for removing the remaining pump light $L_P$ may be omitted.

Figure 5:
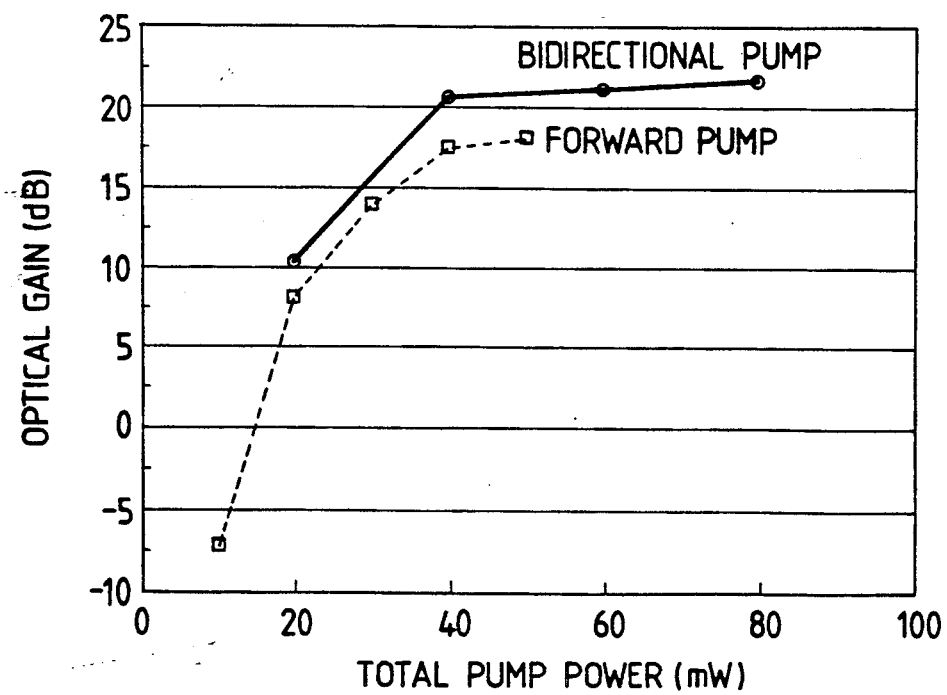
FIG. 5 is a graph showing the relationship between the input power of pumping light and the gain of an optical amplifying element.
Figure 6:
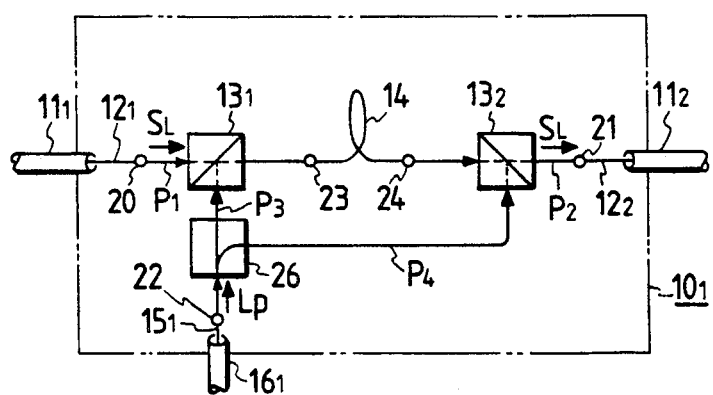
FIG. 6 is a block diagram showing still another example of the optical repeater.

For example, in the case of the forward excitation, the pump light power and the gain of the optical fiber amplifying element, for instance, the erbium-doped fiber, bear such a relationship as indicated by the broken line in FIG. 5. When the power of the pump light exceeds a certain value (about 15 mW in FIG. 5), the gain goes positive, but the relationship between the pump light power and the gain is not linear; namely, the gain will be substantially saturated, even if the power of the pump light is increased in excess of a fixed value (about 50 mW, for example). This means that the utility factor of power decreases when the input power of the pump light is increased in excess of a certain value. In the case of the forward excitation, as indicated by the broken line, a gain of 18 dB or so is obtained when the power of the pump light is 40 mW, but the gain increases only to approximately 19 dB even if the power of the pump light is 80 mW. According to our experiments, when 40 mW pump light is input, about 1.6 mW pump light is output. This indicates that the output end portion of the erbium-doped fiber is not supplied with a sufficient amount of pump light to make the gain positive in FIG. 5. To avoid this, it is possible to employ such an arrangement as shown in FIG. 6, in which external pump light $L_P$ is divided by an optical divider 26 into two and they are applied via optical paths $P_3$ and $P_4$ to the couplers $13_1$ and $13_2$, respectively, so that they are simultaneously supplied to the optical amplifying element 14, one through the input end 23 in the same direction as the signal light $S_L$ and the other through the output end 24 in the direction opposite from the signal light $S_L$. This is called a bidirectional excitation. With such an arrangement, it is possible to perform highly efficient excitation at both of the input and output end portions of the optical fiber amplifying element, providing for improved gain as indicated by the solid line in FIG. 5. For example, when 20 mW pump light was supplied to the optical fiber amplifying element through its input and output ends 23 and 24 simultaneously, a gain of 21 dB was obtained as shown in FIG. 5. In the case of the forward excitation with 40 mW pump light, however, the gain was only 18 dB.

The embodiment illustrated in FIG. 2 is advantageous in that as long as the places C and D suitable for installation of pump light sources are available, for example, within one hundred kilometers from desired repeating points, a long distance optical network can be constructed by sequentially installing such optical repeating points. The FIG. 2 embodiment has been described in connection with the case of transmitting the signal light from the transmitting terminal 30A at the location A to the receiving terminal 30B at the location B, but in practice, the optical fiber cables $11_1$, $11_2$ and $11_3$ each may have a plurality of optical signal transmission fibers for two-way optical signal transmission and the optical repeaters $10_1$ and $10_2$ each also include optical amplifying elements corresponding to the plurality of optical signal transmission fibers. For the sake of brevity, however, other embodiments of the invention will also be described in respect of the system of transmitting the signal light $S_L$ in one direction.

Figure 7:
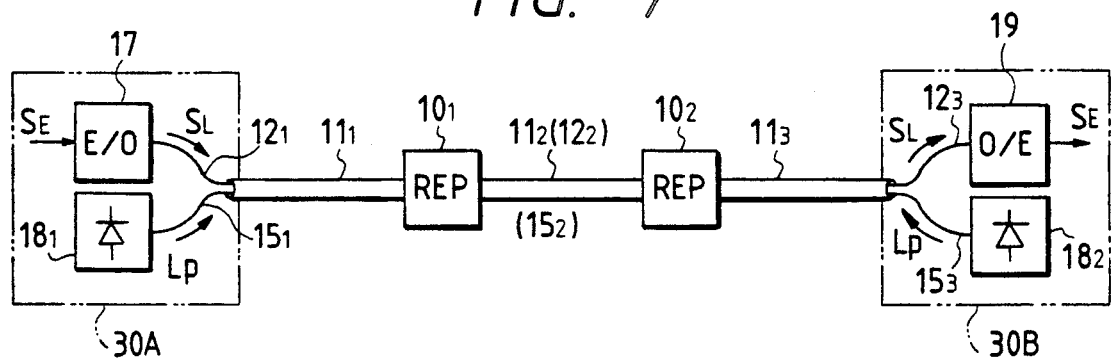
FIG. 7 is a block diagram illustrating a second embodiment of the optical network of the present invention.

FIG. 7 illustrates a second embodiment of the optical network of the present invention. In this optical network the transmitting terminal 30A which sends the signal light $S_L$ and the receiving terminal 30B which receives the signal light $S_L$ supply the pump light $L_P$ to the optical repeaters $10_1$ and $10_2$, respectively. To perform this, the optical fiber cables $11_1$ and $11_3$ have pump light transmission fibers $15_1$ and $15_3$, respectively, over which the pump light $L_P$ from pump light sources $18_1$ and $18_2$ provided in the terminals 30A and 30B is applied to the optical repeaters $10_1$ and $10_2$. The optical repeaters $10_1$ and $10_2$ may be any of those shown in FIGS. 3, 4 and 6. In the optical repeater $10_1$ the optical signal input terminal 20 and the pump light input terminal 22 are connected to the same optical fiber cable $11_1$ and in the optical repeater $10_2$ the optical signal output terminal 21 and the pump light input terminal 22 are connected to the same optical fiber cable $11_3$.

Figure 8:
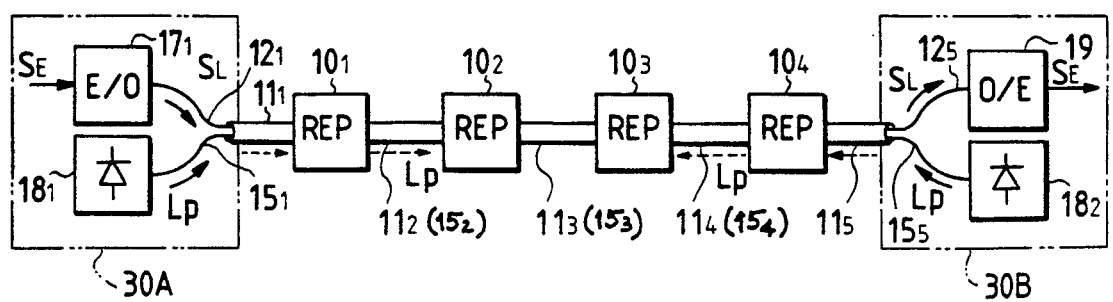
FIG. 8 is a block diagram illustrating a third embodiment of the optical network of the present invention.
Figure 9:
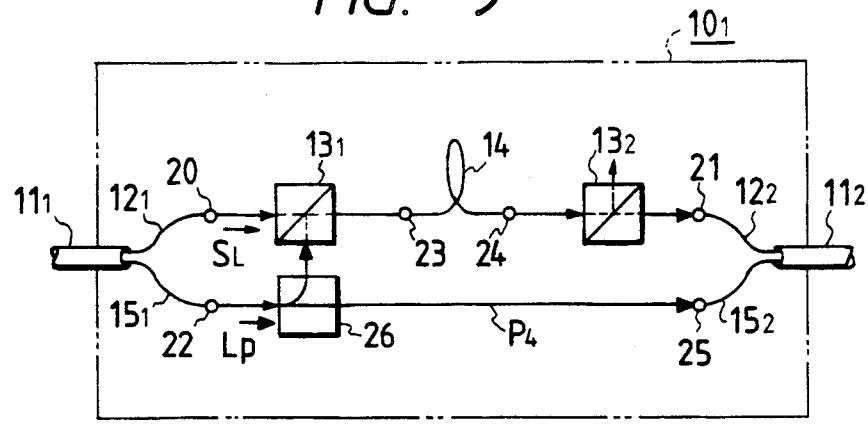
FIG. 9 is a block diagram showing an example of an optical repeater for use in the optical network depicted in FIG. 8.

FIG. 8 illustrates a third embodiment of the optical network of the present invention. In this embodiment, for example, four optical repeaters $10_1$ through $10_4$ are provided in the FIG. 7 embodiment and the pump light $L_P$ is supplied to all of the optical repeaters from the transmitting and receiving terminals 30A and 30B through the pump light supplying fibers $15_1$ to $15_5$. The optical repeater $10_1$ has such an arrangement as shown in FIG. 9, in which one portion of the pump light $L_P$ is divided by an optical divider 26 and is provided to the coupler $13_1$, from which it is applied, together with the signal light $S_L$, to the optical amplifying element 14 to excite it, and the other portion of the pump light is provided via the pump light supplying optical fiber $15_2$ to the optical repeater $10_2$ of the next stage. The optical repeater $10_4$ may also be of the same structure as depicted in FIG. 9, but in this case, the terminals 20 and 22 are connected to the optical fiber cable $11_5$ and the terminals 21 and 23 are connected to the optical fiber cable $11_4$. By employing the FIG. 9 arrangement for the intermediate optical repeaters $10_2$ and $10_3$ as well, the number of optical repeaters used can be increased. In any of optical repeaters $10_1$ through $10_4$ the pump light $L_P$ may be applied to the optical amplifying element 14 through its optical signal output end 24. Further, the optical network may also be arranged so that the pump light $L_P$ is supplied from either one of the terminals 30A and 30B.

Figure 10:
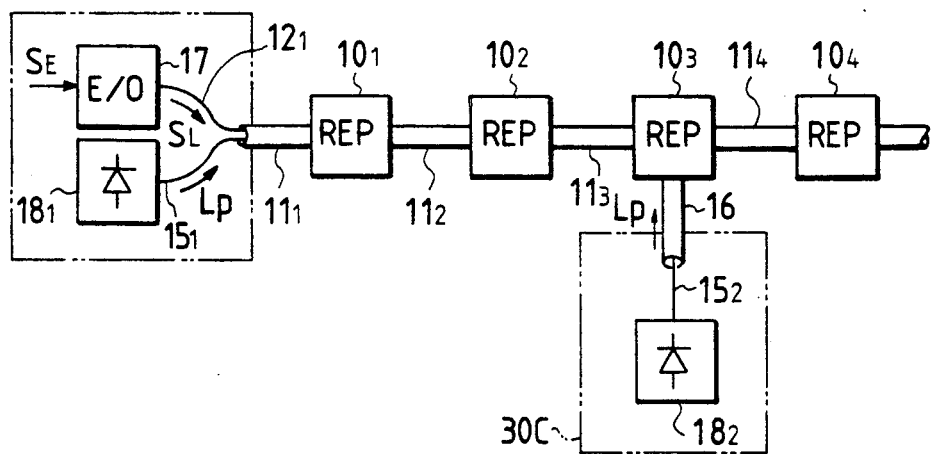
FIG. 10 is a block diagram illustrating a fourth embodiment of the optical network of the present invention.
Figure 11:
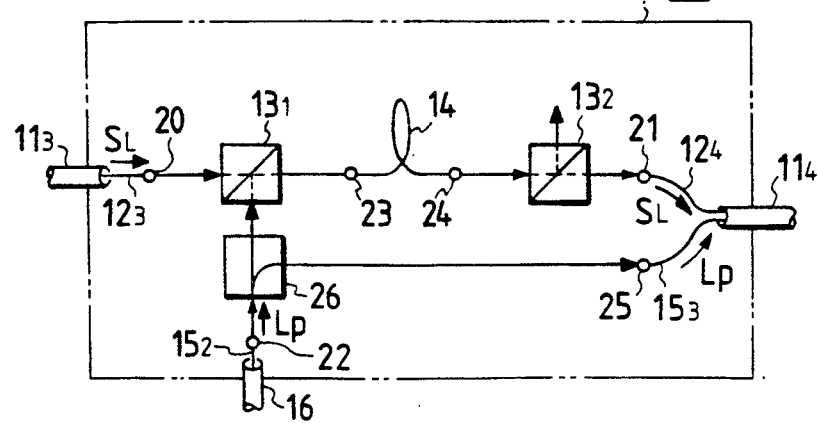
FIG. 11 is a block diagram showing an example of an optical repeater for use in the optical network depicted in FIG. 10.
Figure 12:
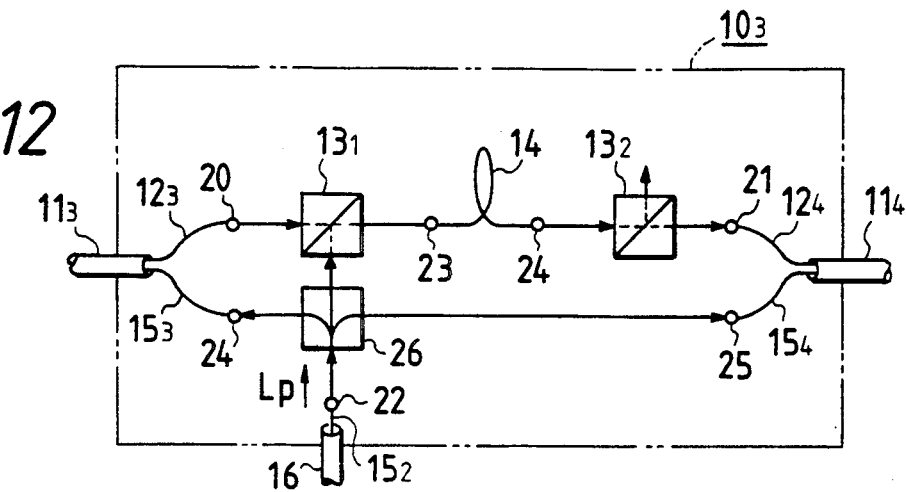
FIG. 12 is a block diagram showing another example of the optical repeater for use in the optical network depicted in FIG. 10.

FIG. 10 illustrates a fourth embodiment of the optical network of the present invention which is a combination of the embodiments depicted in FIGS. 2 and 8. In this embodiment the transmitting terminal 30A sends the signal light $S_L$ and the pump light $L_P$ to the optical repeater $10_1$ via the optical fibers $12_1$ and $15_1$ accommodated in the optical fiber cable $11_1$, respectively. The optical repeater $10_1$ has the same construction as shown in FIG. 9, for instance. The signal light $S_L$ is input into the optical amplifying element 14, and one portion of the pump light $L_P$ is divided by the optical divider 26 and is then provided via the coupler $13_1$ to the optical amplifying element 14 together with the signal light $S_L$. The other portion of the pump light $L_P$ is provided via the optical fiber $15_2$ to the optical repeater $10_2$ of the next stage, in which it is used to excite the optical amplifying element 14. On the other hand, pump light $L_P$ is supplied from the pump light source $18_2$ of the support equipment 30C to the optical repeater $10_3$ via the optical fiber $15_2$ of the optical fiber cable 16. The optical repeater $10_3$ has an arrangement, for example, such as shown in FIG. 11, in which one portion of the pump light $L_P$ supplied from the optical fiber cable 16 is divided by the optical divider 26 and is then provided to the coupler $13_1$, from which one portion of the pump light is applied, together with the signal light $S_L$, to the optical amplifying element 14 to excite it. The other portion of the pump light $L_P$ is supplied to the optical repeater $10_4$ of the next stage via the pump light supplying optical fiber $15_3$ of the optical cable $11_4$. In subsequent stages of the optical network each support equipment of the same construction as the support equipment 30C, installed at a desired point for every plurality of optical repeaters, is connected to the corresponding optical repeater, which divides into two portions the pump light $L_P$ supplied thereto and uses the one portion of the pump light $L_P$ for optical amplification and sends the other portion of the pump light $L_P$ to the optical repeater of the succeeding stage. The optical repeater $10_3$, which is connected to the support equipment 30C in FIG. 10, may also be arranged as depicted in FIG. 12, for example. In this instance, the pump light $L_P$ supplied via the optical fiber cable 16 is divided into three portions by the optical divider 26, one portion of the divided pump light $L_P$ is provided to the optical amplifying element 14, another portion of the pump light $L_P$ is sent via the pump light supplying optical fiber $15_4$ to the optical repeater $10_4$ of the next stage, and the remaining portion of the pump light $L_P$ is sent via the pump light supplying optical fiber $15_3$ to the optical repeater $10_2$ of the preceding stage. With such an arrangement, the optical repeater which is supplied with the pump light directly from the support equipment is capable of supplying one portion of the pump light to at least one optical repeater on each of the preceding side and the succeeding side.

Figure 13:
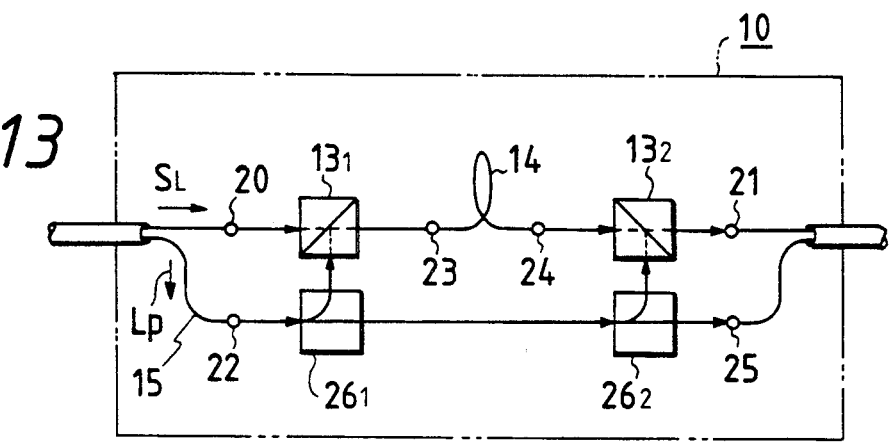
FIG. 13 is a block diagram showing a modified form of the optical repeater shown in FIG. 9.
Figure 14:
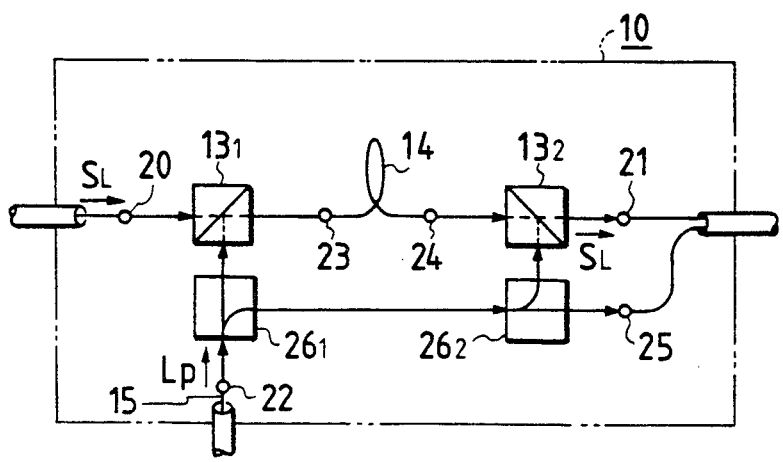
FIG. 14 is a block diagram showing a modified form of the optical repeater shown in FIG. 11.
Figure 15:
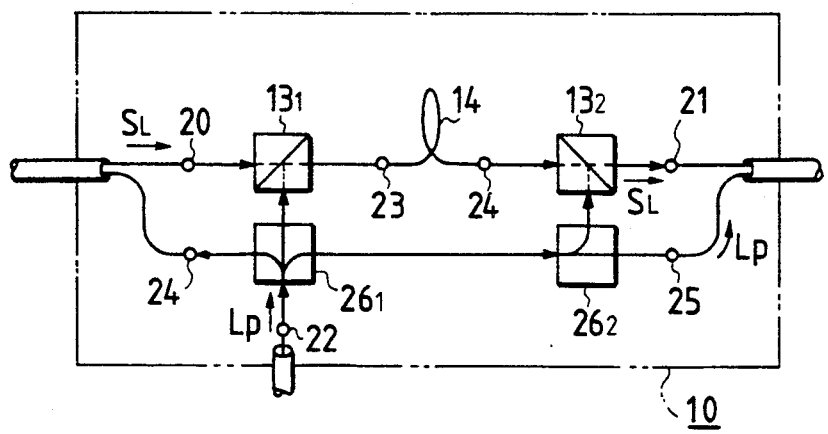
FIG. 15 is a block diagram showing a modified form of the optical repeater depicted in FIG. 12.

It will be seen from the above that when the optical repeater of the construction shown in FIG. 12 is used as each of the optical repeaters $10_1$ and $10_2$ in the embodiment of FIG. 2, optical repeaters which are not connected directly to any support equipment can be provided at both sides of each of the optical repeaters $10_1$ and $10_2$. While in the optical repeaters depicted in FIGS. 9, 11 and 12 the pump light $L_P$ from the optical divider 26 is applied to the optical amplifying element 14 via its input end 23, the pump light $L_P$ may also be applied via the output end 24. Moreover, the optical repeaters depicted in FIGS. 9, 11 and 12 may be modified as shown in FIGS. 13, 14 and 15, in each of which a second optical divider $26_2$ is provided so that the pump light is applied to the optical amplifying element 14 via the output end 24 as well, thereby effecting the bidirectional excitation of the optical amplifying element 14.

Figure 16:
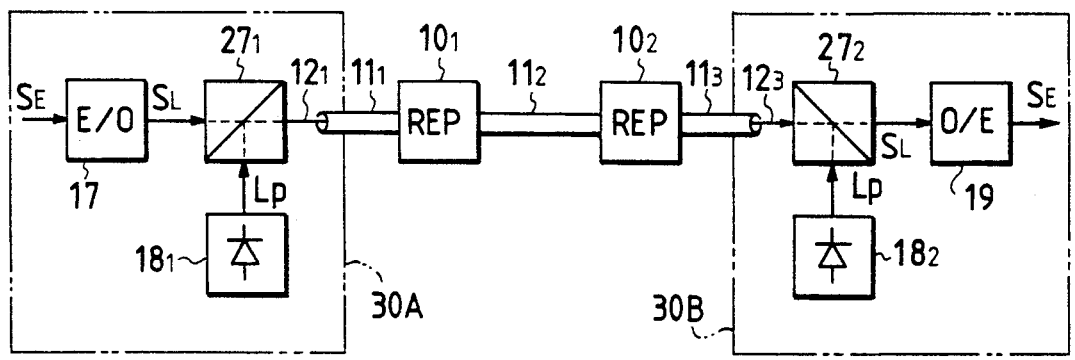
FIG. 16 is a block diagram illustrating a fifth embodiment of the optical network of the present invention.

FIG. 16 illustrates a fifth embodiment of the optical network of the present invention. In this embodiment the pump light $L_P$ is supplied from the transmitting terminal 30A and the receiving terminal 30B to the optical repeaters $10_1$ and $10_2$, respectively, but no optical fibers dedicated to the transmission of pump light are provided in the optical cables $11_1$ and $11_2$, and the pump light $L_P$ is transmitted via the optical signal transmission fibers $12_1$ and $12_3$. In the transmitting terminal 30A the signal light $S_L$ and the pump light $L_P$ are coupled together by a coupler $27_1$ formed by a dichroic mirror, for example, and then provided on the optical signal transmission fiber $12_1$ of the optical fiber cable $11_1$. A directional optical coupler may also be used as the coupler $27_1$.

Figure 17:
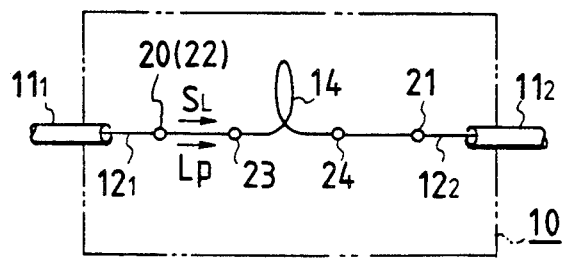
FIG. 17 is a block diagram showing an example of an optical repeater for use in the optical network depicted in FIG. 16.

The optical repeater $10_1$ is optically coupled to the optical fibers $12_1$ and $12_2$ of the optical fiber cables $11_1$ and $11_2$ at the input end 23 and the output end 24 of the optical amplifying element 14 as shown in FIG. 17, for instance. Hence, the optical amplifying element 14 is excited by the pump light $L_P$ supplied from the optical fiber $12_1$ and amplifies the signal light $S_L$ input from the same optical fiber $12_1$ and then provides the amplified signal light $S_L$ on the optical fiber $12_2$. The optical amplifying element 14 is, for example, the aforementioned erbium-doped fiber of about the same diameter as those of the optical signal transmission fibers $12_1$ and $12_2$ and is fusion-spliced at the input and output ends 23 and 24 to the optical fibers $12_1$ and $12_2$. In this case, it is possible to form the optical fiber cables $11_1$ and $11_2$ as a single continuous cable and incorporate thereinto the optical amplifying element 14. On the other hand, in the receiving terminal 30B shown in FIG. 16, the signal light $S_L$ is extracted by a coupler $27_2$ and the pump light $L_P$ from the pump light source $18_2$ is provided via the coupler $27_2$ to the optical signal transmission fiber $12_3$ of the optical fiber cable $11_3$, from which it is applied to the optical repeater $10_2$. The optical repeater $10_2$ also has the same structure as that shown in FIG. 16.

Figure 18:
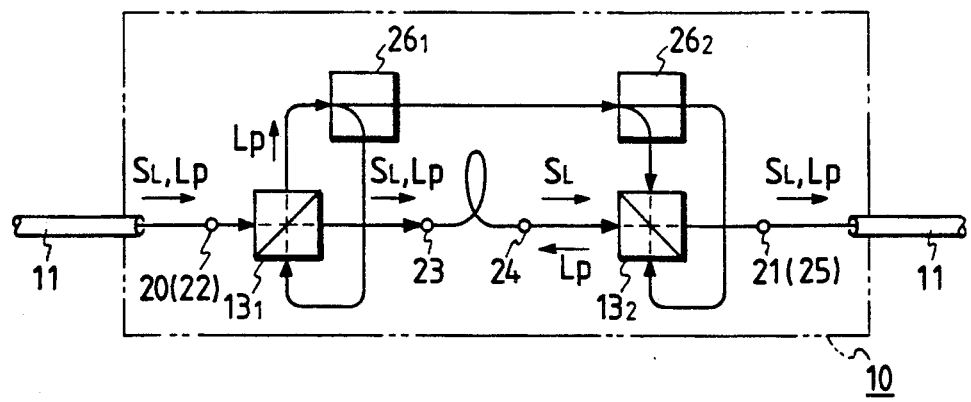
FIG. 18 is a block diagram showing a modified form of the optical repeater depicted in FIG. 17.

The optical repeaters $10_1$ and $10_2$ may also be arranged in the form of bidirectional excitement as shown in FIG. 18, for instance. In this example the signal light $S_L$ and the pump light $L_P$ received via the optical fiber cable 11 are separated by an optical filter $13_1$ from each other, and the pump light $L_P$ is divided by the optical divider $26_1$ into two, one port of which is coupled again with the signal light $S_L$ by the optical filter $13_1$ and then applied to the optical amplifying element 14. The other port of the pump light $L_P$ is further divided by the optical divider $26_2$, one part of which is applied via the optical filter $13_2$ to the optical amplifying element 14 and the other port of which is provided via the optical filter $13_2$ on the optical fiber cable 11 and sent to the next stage.

In general, the spectrum of signal light must be narrow so as to avoid the influence of dispersion by optical fiber. Moreover, optical fiber has a nonlinear optical effect (stimulated Brillouin scattering), and on this account, a maximum power of light which can be transmitted over optical fiber is limited to a certain value per unit spectrum. For example, in the case of using an optical signal of a 50 MHz bandwidth, an average power of the signal light $S_L$ that is coupled into the optical signal transmission fiber is limited to, for instance, several milliwatts or below. In contrast thereto, since the pump light need not be of a narrow bandwidth, pump light of a relatively large power, for instance, on the order of hundreds of milliwatts to several watts, can be transmitted over the optical fiber when pump light of a wide bandwidth is employed. That is to say, in the first to fifth embodiments described above, the power of the signal light $S_L$ to be provided on the optical fiber $12_1$ from the transmitting terminal 30A is limited to, for example, about 3 mW (in the case of a signal of a 50 MHz band), but since pump light of sufficient power can be provided to the optical repeater so that the optical amplification is performed with a gain corresponding to a loss by the optical fiber, a long-distance optical transmission can be achieved.

Figure 19:
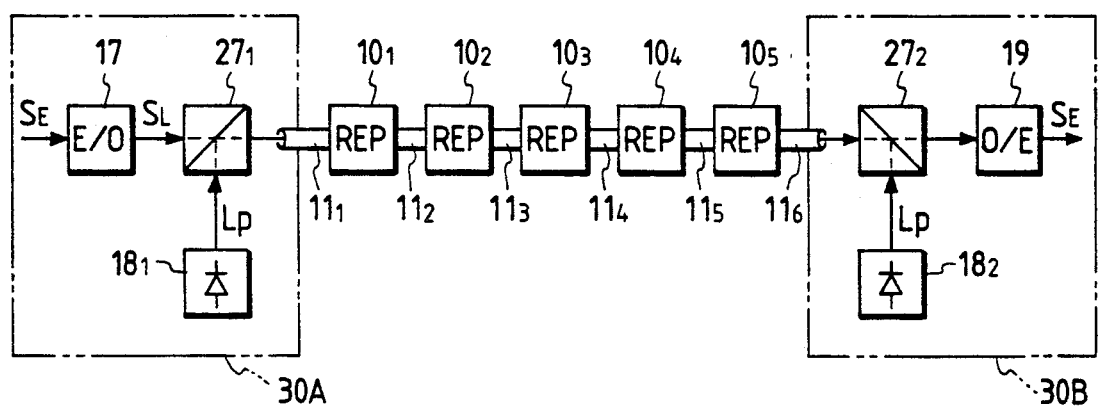
FIG. 19 is a block diagram illustrating a sixth embodiment of the optical network of the present invention.

FIG. 19 illustrates a modification of the FIG. 16 embodiment, in which the number of optical repeaters used is increased. In a certain optical repeater one portion of the pump light supplied via the optical signal transmission fiber 12 from the preceding stage is used to amplify the signal light by the optical amplifying element and the remaining pump light is provided via the optical signal transmission fiber 12 to the optical repeater of the next stage, in which it is used for excitation of the optical amplifying element. Each of the optical repeaters $10_1$ through $10_5$ may be of the same construction as that shown in FIG. 17. For example, in the optical repeater $10_1$ one portion of the pump light $L_P$ supplied via the optical signal transmission fiber $12_1$ from the transmitting terminal 30A is dissipated to excite the optical amplifying element 14 and the remaining pump light $P_L$ is delivered to the optical repeater $10_2$ of the next stage. In the optical repeater $10_2$ one portion of the pump light $L_P$ supplied from the optical repeater $10_1$ is used to excite the optical amplifying element 14 and the remaining pump light $L_P$ is provided to the optical repeater $10_3$ of the next stage. Similarly, the receiving terminal 30B also supplies pump light $L_P$ to the optical repeaters $10_5$, $10_4$ and $10_3$. The optical repeater shown in FIG. 18 may be employed as each of the optical repeaters $10_1$ through $10_5$, but since the optical repeater of FIG. 18 transmits the pump light $L_P$ in only one direction, the optical dividers $26_1$ and $26_2$ in the optical repeaters $10_4$ and $10_5$, for example, must be reversed in direction. For example, when the optical amplifying element is an erbium-doped fiber, the amount of erbium doping and/or the length of the erbium-doped fiber is suitably selected so that a desired gain is obtained in the optical amplifying element of each optical repeater. By selecting the gain in each optical repeater such that the SN ratio at the optical signal input terminal 20 of the next-stage optical repeater is higher than a predetermined value, an optical network of excellent SN ratio can be implemented. By providing an optical repeater at each position where the loss in each transmission span is 4.3 dB and by setting the gain in each optical repeater to 4.3 dB, in particular, an optical network of a maximum SN ratio can be formed. The same is true of the other embodiments.

Figure 20:
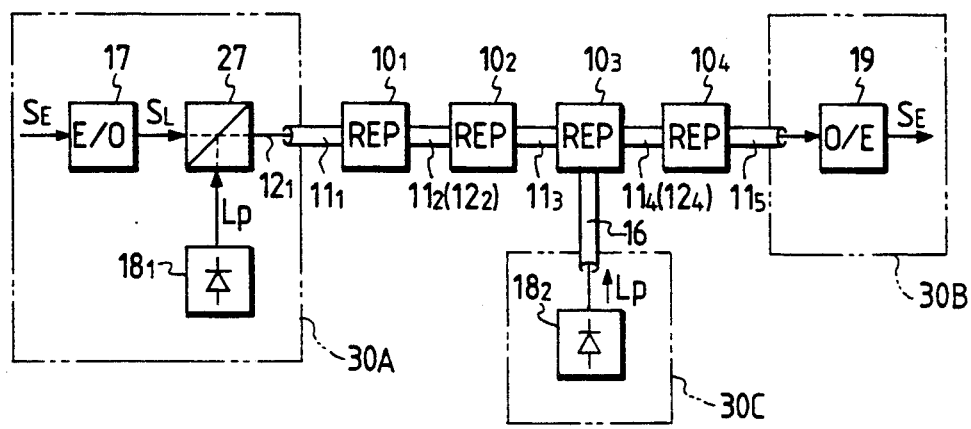
FIG. 20 is a block diagram illustrating a seventh embodiment of the optical network of the present invention.
Figure 21:
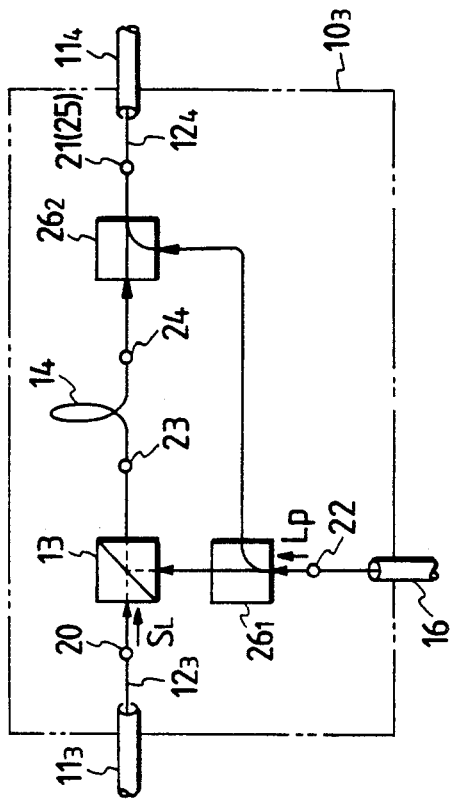
FIG. 21 is a block diagram showing an example of an optical repeater for use in the optical network depicted in FIG. 20.

FIG. 20 illustrates a modified form of the embodiment shown in FIG. 19. Also in this example, the optical fiber cables $11_1$ to $11_5$ do not have the optical fibers dedicated to the transmission of pump light, and the signal light $S_L$ and the pump light $L_P$ are transmitted over the optical signal transmission fibers. The pump light $L_P$ is supplied from the pump light source $18_1$ of the transmitting terminal 30A to the optical repeaters $10_1$ and $10_2$ sequentially via the optical signal transmission fibers $12_1$ and $12_2$ as is the case with the FIG. 19 embodiment. The optical repeater $10_3$ may be constructed, for example, as shown in FIG. 3, but in this case, the demultiplexer $13_2$ is not provided, and the optical repeater $10_3$ is supplied with the pump light $L_P$ via the optical fiber cable 16 from the pump light source $18_2$ of the support equipment 30C. In FIG. 20 the remaining pump light, except that used for optical amplification by the optical amplifying element in the optical repeater $10_3$, is provided via the optical signal transmission fiber $12_4$ of the optical cable $11_4$ to the optical repeater $10_4$, in which it is used for exciting the optical amplifying element. An optical repeater shown in FIG. 21 may also be used as the optical repeater $10_3$. In FIG. 21 the pump light $L_P$ from the support equipment 30C is divided by the optical divider $26_1$ into two, one part of which is applied from the coupler 13 to the optical amplifying element 14 together with the signal light $S_L$ and the other part of which is applied to the direction optical coupler $26_2$, in which it is multiplexed with the amplified signal light, thereafter being sent to the next stage. Of course, a coupler such as a dichroic mirror may also be employed in place of the directional optical coupler $26_2$. A long-distance optical network can be realized by providing such an optical repeater as shown in FIG. 3 or 21 every plurality of optical repeaters and by supplying the pump light from the corresponding support equipment as mentioned above.

Figure 22:
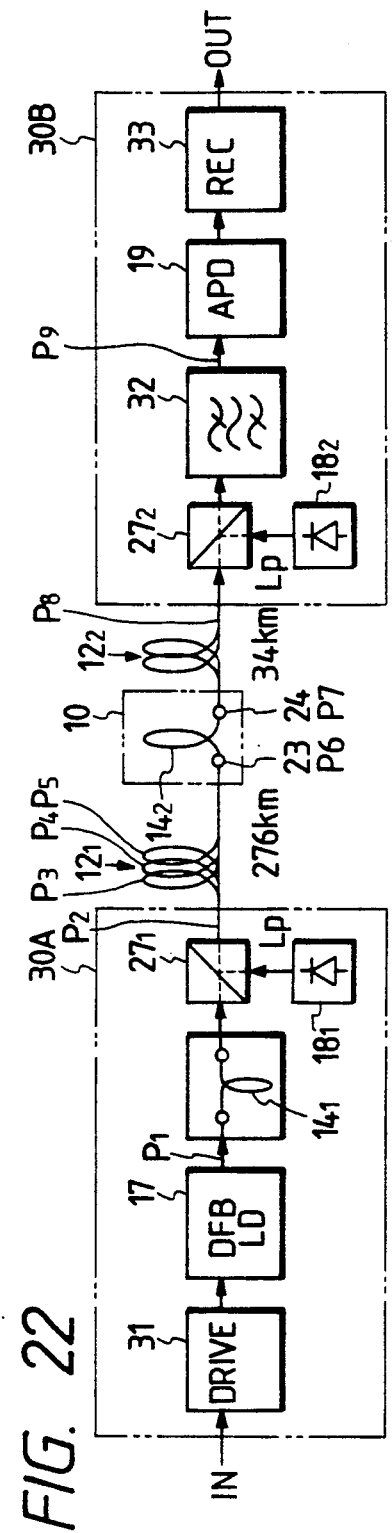
FIG. 22 is a block diagram of the optical network of the present invention formed for experiments.

Incidentally, in the case where the signal light $S_L$ and the pump light $L_P$ are superimposed on each other and transmitted over the same optical signal transmission fiber as in the embodiments depicted in FIGS. 16, 19 and 20, the Raman amplification effect in the optical fiber can be expected by a suitable selection of the material of the optical fiber and the wavelengths of the pump light and the signal light. For instance, when silica optical fiber is employed, signal light of a 1.55 μm wavelength and pump light of a 1.45 to 1.49 μm wavlelength are used. FIG. 22 is a block diagram of an experimental transmission system with which experiments were conducted on a 310 km transmission line via one optical repeater, and FIG. 23 shows the power of signal light measured at predetermined points on the transmission line. In the transmitting terminal 30A a signal of 1.8 Gbits/sec is applied to a driver 31, the output of which is used to drive a distributed feedback (DFB) type laser diode 17. The output optical signal of the laser diode 17 is amplified by the optical amplifier $14_1$ formed using an erbium-doped fiber and is then applied to the coupler $27_1$, in which it is wavelength-multiplexed with pump light $L_P$ from a laser diode $18_1$, thereafter being provided to one end of a dispersion shifted fiber $12_1$. The pump light source for the optical amplifying element $14_1$ is not shown for brevity. The optical fiber $12_1$ is 276 km long and is connected at the other end to the input end 23 of an erbium-doped fiber which is the optical amplifying element $14_2$ forming the optical repeater 10. The output end 24 of the optical amplifying element $14_2$ is connected to one end of the optical fiber $12_2$ of the same material as the optical fiber $12_1$, and signal light output from the other end of the optical fiber $12_2$ is applied to an avalanche photodiode (APD) 19 via the coupler $27_2$ and a narrow-bandpass optical filter 32 which permits the passage therethrough of only the signal light. In the APD 19 the signal light is converted into an electrical signal. The output of the APD 19 is applied to a receiver 33, in which it is shaped and retimed to regenerate a signal.

In FIG. 23, measured values of the power of optical signal at the output $P_1$ of the laser diode 17, the output $P_2$ of the optical amplifier $14_1$, points $P_3$ to $P_5$ on the optical fiber $12_1$ at predetermined distances from the transmitting terminal 30A, the input $P_6$ and the output $P_7$ of the optical repeater 10, the input $P_8$ of the receiving terminal 30B, and the input $P_9$ of the APD 19 are shown at the corresponding points $P_1$ to $P_9$ of measurement, respectively. The broken line represents a premeasured transmission loss, 0.2 dB/km, of this optical fiber. In the transmitting terminal 30A the output of the laser diode 17 ($P_1$) is amplified about 15 dB by the optical amplifier $14_1$ and is then input into the optical fiber $12_1$. It must be noted here that the level of the signal light remains substantially constant over a distance of around 20 km from the transmitting terminal 30A in spite of the transmission loss by the optical fiber ($P_2$ to $P_3$). The reason for this is that the signal light was subjected to Raman amplification in this 20 km section. The pump light $L_P$ from the transmitting terminal 30A is consumed for the Raman amplification in this section, and thereafter the Raman amplification diminishes ($P_3$ to $P_6$) and the signal light is affected by the transmission loss of the optical fiber, 0.2 dB/km. The Raman gain obtained in the 0 to 50 km section was 4.3 dB. This means that although the optical power transmission capacity of the optical fiber is limited owing to its nonlinear characteristic as referred to previously, the power of signal light transmitted was equivalent to 4.3 dB in excess of the limit.

In the optical repeater 10 the pump light $L_P$ is supplied from the receiving terminal 30B and the signal light is amplified by the optical amplifier $14_2$ with a gain of 13.2 dB or so ($P_6$ to $P_7$) and then provided on the optical fiber $12_2$. Also in the optical fiber $12_2$ the signal light was subjected to the Raman amplification and its gain was about 5.5 dB. As shown in FIG. 23, the level of the signal light slightly drops at the input $P_9$ of the APD 19 because of the use of the optical filter 32 in this experiment. By designing the optical network through utilization of the Raman amplification effect as mentioned above, a total of 9.8 dB was obtained only in the Raman gain. Another important thing is that since the power of signal light transmitted from the transmitting terminal 30A is as great as 20 mW (in the case of 27 GHz in the experiment), pump light of very great power would be needed for high-gain amplification of the signal light if an optical repeater is located at a point near the transmitting terminal 30A where the signal light has not yet been attenuated so much. In contrast thereto, the power of pump light necessary for high-gain amplification would be very slight if the optical repeater is located at a point far from the transmitting terminal 30A where the level of signal light has been substantially lowered by the transmission loss of the optical fiber. Hence, it is also possible in the FIG. 16 embodiment, for example, to employ an arrangement in which the pump light to the optical repeaters $10_1$ and $10_2$ is supplied from the receiving terminal 30B and the pump light from the transmitting terminal 30A is used to obtain the Raman gain alone.

Incidentally, the Raman amplification effect can be expected in the case where the pump light and the signal light are transmitted over the optical signal transmission fiber in the same direction or in opposite directions as in the embodiment of FIGS. 16, 19, 20 and 22, and the Raman gain is maximum when the direction of polarization of the signal light and the direction of polarization of the pump light are parallel to each other, but the gain is 1 (0 dB) when their directions of polarization are orthogonal to each other. Since the direction of polarization of light usually changes as it propagates through optical fiber, the Raman gain fluctuates when linearly polarized pump light is employed. FIG. 24 illustrates the construction of terminal equipment which avoids such fluctuation in the Raman gain.

FIG. 24 shows an example of the construction of the receiving terminal equipment 30B, in which pump light sources 18a and 18b, which operate independently of each other, yield pump lights $L_P$ of perpendicularly intersecting directions of polarization and they are superimposed one on the other by a polarized wave coupler 27b while maintaining the perpendicularly intersecting relationship in their direction of polarization. The thus superimposed pump lights $L_P$ are reflected by a coupler 27a to be delivered to the optical signal transmission fiber 12. When such two multiplexed pump lights $L_P$ perpendicularly intersecting in the direction of polarization are incident to the optical fiber 12, their directions of polarization always undergo the same change, and consequently, their orthogonality is maintained; hence, the sum of polarization components of the signal light in the two directions of polarization is constant, causing no variations in the Raman gain.

Figure 26:
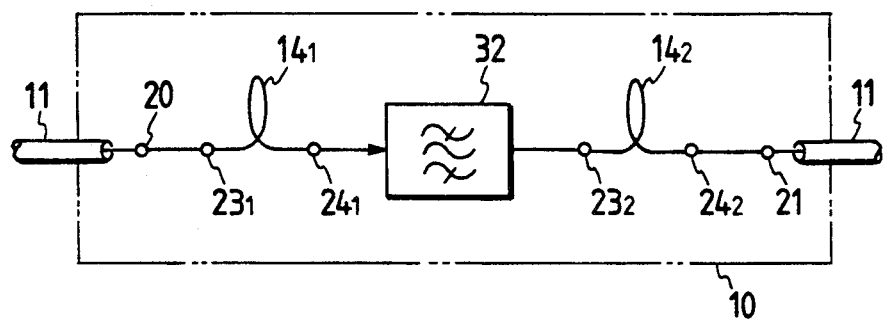
FIG. 26 is a block diagram showing another example of the optical repeater of the present invention.

FIG. 25 illustrates another example of the construction of the optical repeater, for instance, $10_1$ in FIGS. 16, 19 and 20. In this optical repeater $10_1$ band-pass optical filters $32_1$ and $32_2$, which permit the passage therethrough of the signal light $S_L$ and the pump light $L_P$ but inhibit the passage therethrough of other optical noise, are provided at the input end 23 side and the output end 24 side of the optical amplifying element 14. In this instance, such a filter may be provided at at least one of the input end and the output end of the optical amplifying element 14. With the provision of such band-pass optical filters in each optical repeater, it is possible to prevent that optical noise outside the signal band, occurring in the optical amplifying element 14, is sequentially accumulated in respective optical repeaters—this ensures the construction of an optical repeated system with an excellent SN ratio. The same effect could be obtained in the case where a band-pass optical filter, which permits the passage therethrough of the band of the signal light $S_L$, is similarly provided at at least one of the input and output ends 23 and 24 of the optical amplifying element 14 or a coupler of a characteristic which passes therethrough only the band of the signal light $S_L$ but reflects light of other bands is used as at least one of the couplers $13_1$ and $13_2$ in the optical repeaters shown in FIGS. 3, 4, 6, 9, 11 to 15, 18 and 21. Alternatively, the various optical repeaters described previously may be constructed as shown in FIG. 26, in which the optical amplifying element 14 is divided into two and the above-mentioned band-pass optical filter 32 is interposed therebetween.

Figure 27:
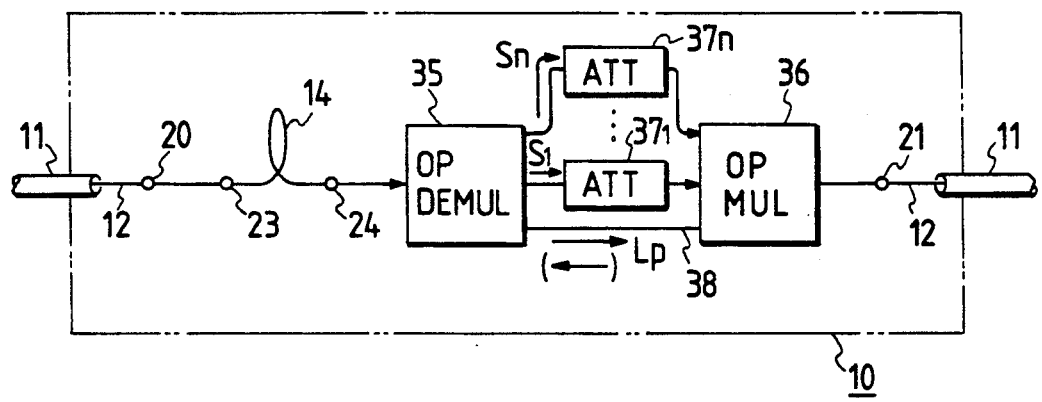
FIG. 27 is a block diagram showing another example of the optical repeater of the present invention.

In the case of transmitting two or more signal lights wavelength-multiplexed by the optical amplifying element which amplifies two or more lights of different wavelengths, such as the aforementioned erbium-doped fiber, the gain of the optical amplifying element usually differs with wavelengths and the transmission loss in each transmission section also differs with wavelengths. In such an instance, if each signal light is amplified intact without adjusting the gain for each wavelength in any optical repeaters, the gains for the respective wavelengths vary more and more largely until the gain for signal light of a certain wavelength exceeds the linear operation range of the optical amplifying element, making normal signal light transmission infeasible. To avoid this, an optical filter which has a desired transmission characteristic of signal light of each wavelength is used as each of the optical filters $32_1$ and $32_2$ in FIG. 25 or the optical filter 32 in FIG. 26 so that the sum of the gain of the optical amplifying element for the signal light of each wavelength and the transmission loss of the signal light by the optical signal transmission fiber becomes substantially constant. Another method is to separate the output light of the optical amplifying element 14 by a demultiplexer 35 into signal lights $S_1$ to $S_n$ in the signal light wavelength band and pump light $L_P$ and adjust the levels of the signal lights $S_1$ to $S_n$ by optical attenuators 37₁ to 37ₙ as shown in FIG. 27. These level-adjusted signal lights S₁ to Sₙ and the pump light Lp provided on a bypass 38 are coupled together by a coupler 36 and then applied to the optical signal transmission fiber 12. In FIG. 27 the pump light Lp may be applied to the coupler 36 from the optical fiber 12 on the signal light transmitting side.

Figure 28:
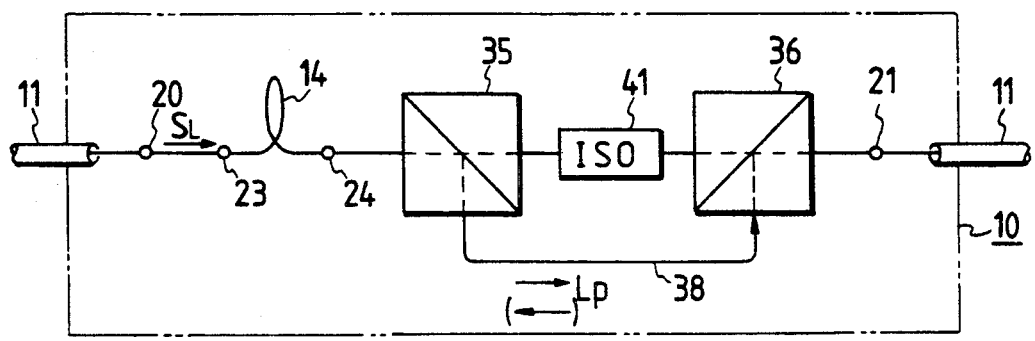
FIG. 28 is a block diagram showing still another example of the optical repeater of the present invention.

FIG. 28 illustrates another example of the construction of the optical repeater for use in FIGS. 16, 19 and 20. In the transmission line in which an optical amplifier is inserted, when the product of the gain of the optical amplifier and the reflectivity as from an optical node in the direction of transmission of signal light to the optical amplifier is greater than 1, an oscillation occurs and no normal signal transmission can be achieved. In this embodiment, in order for the optical repeater to possess bidirectionality for the wavelength band of the pump light and unidirectionality for the signal light so as to prevent its reflected light from returning thereinto, an optical demultiplexing coupler 35 and an optical multiplexing coupler 36 are provided at the side of the output end 24 of the optical amplifying element 14 and a unidirectional element 41, or so-called isolator such as a combination of a YIG element placed in a magnetic field and a polarizer is interposed between the couplers 35 and 36. The signal light output from the optical amplifying element 14 is applied via the coupler 35, the unidirectional element 41 and the coupler 36 to the optical signal transmission fiber 12, and a reflected component of the signal light is intercepted by the unidirectional element 41 and hence cannot return to the optical amplifying element 14. On the other hand, the pump light provided from the optical signal transmission fiber 12 to the coupler 36 is applied therefrom to the coupler 35 and then to the optical amplifying element 14. Thus, the unidirectional element 41 serves as an isolator for the signal light. The same effect could be obtained by providing such an isolator 41 in the signal path on the output side of the optical amplifying element 14 in the optical repeaters shown in FIGS. 3, 4, 6, 9, 11 to 15, 19 and 21.

As described above, according to the present invention, the optical repeater for use in the optical network employs an optical amplifying element which is excited by pump light supplied from the outside and can amplify signal light directly; namely, no semiconductor electronic devices are used. Accordingly, it is possible to economically implement an optical network which is highly reliable and maintenance-free over a long period of time. Moreover, the gain for signal light can be improved by bidirectional excitation of the optical amplifying element of the optical repeater, and hence the repeater spacing can be increased accordingly.

It will be apparent that many modifications and variations may be effected without departing from the scope of the novel concepts of the present invention.

What is claimed is:

1. An optical network comprising:
   an optical cable containing an optical signal transmission fiber which connects at least two terminals and transmits therebetween signal light of a predetermined wavelength;
   at least one optical repeater means inserted in series to said optical signal transmission fiber between said two terminals; and,
   pump light supply means for supplying pump light to said optical repeater means from the outside thereof;
   wherein said optical repeater means includes:
   optical amplifying fiber doped with at least one rare earth element, said optical amplifying fiber having an input end for inputting thereinto said signal light and an output end for outputting therefrom amplified signal light and being excited to a high energy state by said pump light to amplify said signal light;
   input coupling means for optically coupling said optical signal transmission fiber and said input end of said optical amplifying fiber to input said signal light from said optical signal transmission fiber into said optical amplifying fiber;
   output coupling means for optically coupling said optical signal transmission fiber and said output end of said optical amplifying fiber to output said signal light amplified by said optical amplifying fiber to said optical signal transmission fiber; and
   pump light input means for inputting said pump light into said optical amplifying fiber via at least one of said input coupling means and said output coupling means of said optical repeater means, said pump light input means including pump light source means provided in at least one of said two terminals remote from said optical repeater means for generating said pump light, and pump light transmission fiber means which interconnects said pump light source means and said pump light input means to transmit said pump light from said pump light source means;
   the wavelength band of said signal light and the wavelength band of said pump light being so selected that said pump light produces a Raman amplification effect on said signal light in said optical signal transmission fiber and so that said pump light excites said optical amplifying fiber for amplifying said signal light;
   said pump light source means including a plurality of pump light sources for generating a plurality of pump lights of different directions of polarization, and means for multiplexing said plurality of pump lights into said pump light for supplying to said coupling means; and
   said optical signal transmission fiber serving also as said pump light supply means and including coupler means for inputting said pump light from said pump light source means into said optical signal transmission fiber, said pump light input means of said optical repeater means serving also as at least one of said input coupling means and said output coupling means.

2. An optical network comprising:
   an optical cable containing an optical signal transmission fiber which connects at least two terminals and transmits therebetween signal light of a predetermined wavelength;
   at least one optical repeater means inserted in series to said optical signal transmission fiber between said two terminals; and,
   pump light supply means for supplying pump light to said optical repeater means from the outside thereof;
   wherein said optical repeater means includes:
   optical amplifying fiber doped with at least one rare earth element, said optical amplifying fiber having an input end for inputting thereinto said signal light and an output end for outputting therefrom amplified signal light and being excited to a high energy state by said pump light to amplify said signal light;

input coupling means for optically coupling said optical signal transmission fiber and said input end of said optical amplifying fiber to input said signal light from said optical signal transmission fiber into said optical amplifying fiber;

output coupling means for optically coupling said optical signal transmission fiber and said output end of said optical amplifying fiber to output said signal light amplified by said optical amplifying fiber to said optical signal transmission fiber; and pump light input means for inputting said pump light into said optical amplifying fiber via at least one of said input coupling means and said output coupling means of said optical repeater means, said pump light input means including pump light source means provided in at least one of said two terminals remote from said optical repeater means for generating said pump light, and pump light transmission fiber means which interconnects said pump light source means and said pump light input means to transmit said pump light from said pump light source means;

said pump light source means including a plurality of pump light sources for generating a plurality of pump lights of different directions of polarization, and means for multiplexing said plurality of pump lights into said pump light for supplying to said coupling means, the wavelength band of said signal light and the wavelength band of said pump light being so selected that said pump light produces a Raman amplification effect on said signal light in said optical signal transmission fiber and so that said pump light excites said optical amplifying fiber for amplifying said signal light;

said optical repeater means comprising at least two optical repeaters inserted in series with said optical signal transmission fiber at at least two different places, said optical signal transmission fiber serving also as said pump light transmission fiber means, said pump light supply means including coupler means for optically coupling said pump light from said pump light source means to said optical signal transmission fiber to supply said pump light to a first one of said optical repeaters, and pump light coupling means for optically coupling one portion of said pump light to said optical signal transmission fiber between said first optical repeater and a second one of said optical repeaters to provide said one portion of said pump light to said second optical repeater, said pump light input means of said first and second optical repeaters serving also as at least one of said input coupling means and said output coupling means.

3. The optical network of claim 1 or 2 wherein said pump light source means is provided in at least that one of said two terminals which receives said optical signal.

4. The optical network of claim 1 or 2 wherein said plurality of pump light sources are two pump light sources for generating two pump lights of perpendicularly intersecting directions of polarization.

5. The optical network of claim 1 or 2 wherein said optical repeater means has optical dividing means for dividing said pump light supplied thereto into first pump light and second pump light; and wherein said input coupling means and said output coupling means constitute said pump light input means, whereby said first pump light and said second pump light from said dividing means are input into said optical amplifying fiber via said input end and said output end thereof, respectively.

6. An optical network comprising:

an optical cable containing an optical signal transmission fiber which connects at least two terminals and transmits therebetween signal light of a predetermined wavelength;

at least one optical repeater means inserted in series to said optical signal transmission fiber between said two terminals; and, pump light supply means for supplying pump light to said optical repeater means from the outside thereof;

wherein said optical repeater means includes:

optical amplifying fiber doped with at least one rare earth element, said optical amplifying fiber having an input end for inputting thereinto said signal light and an output end for outputting therefrom amplified signal light and being excited to a high energy state by said pump light to amplify said signal light;

input coupling means for optically coupling said optical signal transmission fiber and said input end of said optical amplifying fiber to input said signal light from said optical signal transmission fiber into said optical amplifying fiber;

output coupling means for optically coupling said optical signal transmission fiber and said output end of said optical amplifying fiber to output said signal light amplified by said optical amplifying fiber to said optical signal transmission fiber; and pump light input means for inputting said pump light into said optical amplifying fiber via at least one of said input coupling means and said output coupling means of said optical repeater means, said pump light input means including pump light source means provided in at least one of said two terminals remote from said optical repeater means for generating said pump light, and pump light transmission fiber means which interconnects said pump light source means and said pump light input means to transmit said pump light from said pump light source means;

said optical repeater means comprising at least two optical repeaters inserted in series with said optical signal transmission fiber at at least two different places, said pump light source means being provided in at least one of said terminals, and said pump light transmission fiber means including a first pump light transmission fiber provided in said optical fiber cable for interconnecting said pump light source means to said first optical repeater, and a second pump light transmission fiber which is supplied at one end, in said first optical repeater, with one portion of said pump light supplied to said first optical repeater and connected at the other end to said pump light input means of a second one of said optical repeaters, said second pump light transmission fiber being provided in said optical fiber cable between said first and second optical repeaters.

7. The optical network of claim 6 wherein said first optical repeater has optical dividing means whereby said pump light supplied thereto via said first pump light transmission fiber is divided into first pump light and second pump light and said first pump light is provided on said second pump light transmission fiber; and said pump light input means of said first optical repeater is means for inputting said second pump light into said optical amplifying fiber via at least one of said input coupling means and said output coupling means.

8. An optical network comprising:
an optical cable containing an optical signal transmission fiber which connects at least two terminals and transmits therebetween signal light of a predetermined wavelength;
at least one optical repeater means inserted in series to said optical signal transmission fiber between said two terminals; and,
pump light supply means for supplying pump light to said optical repeater means from the outside thereof;
wherein said optical repeater means includes:
optical amplifying fiber doped with at least one rare earth element, said optical amplifying fiber having an input end for inputting thereinto said signal light and an output end for outputting therefrom amplified signal light and being excited to a high energy state by said pump light to amplify said signal light;
input coupling means for optically coupling said optical signal transmission fiber and said input end of said optical amplifying fiber to input said signal light from said optical signal transmission fiber into said optical amplifying fiber;
output coupling means for optically coupling said optical signal transmission fiber and said output end of said optical amplifying fiber to output said signal light amplified by said optical amplifying fiber to said optical signal transmission fiber;
pump light input means for inputting said pump light into said optical amplifying fiber via at least one of said input coupling means and said output coupling means of said optical repeater means, said pump light input means including pump light source means provided in at least one of said two terminals remote from said optical repeater means for generating said pump light, and pump light transmission fiber means which interconnects said pump light source means and said pump light input means to transmit said pump light from said pump light source means;
said optical repeater means comprising at least two optical repeaters inserted in series with said optical signal transmission fiber at at least two different places, said pump light source means being provided at a place different from the locations of said two terminals, said pump light supply means including a pump light transmission cable having installed therein said pump light transmission fiber means for transmitting said pump light to a first one of said optical repeaters, dividing means provided in said first optical repeater for dividing one portion of said pump light supplied to said first optical repeater, and pump light delivery means for optically coupling said divided portion of said pump light to said optical signal transmission fiber interconnecting said first optical repeater and a second one of said optical repeaters to provide said divided pump light to said second optical repeater.

9. The optical network of claim 6 or 8 wherein said optical repeater means includes a bandpass optical filter provided in an optical path interconnecting said input coupling means and said output coupling means via said optical amplifying fiber for cutting off optical noise except said signal light and said pump light.

10. The optical network of claim 6 or 8 wherein said optical amplifying fiber of said optical repeater means is divided into two parts substantially at the center thereof, and bandpass optical filter means which passes therethrough the wavelength band of said signal light and the wavelength band of said pump light but cuts off other optical noise, said bandpass optical filter means being provided between said divided parts of said optical amplifying fiber.

11. An optical repeater to be connected in series to an optical signal transmission fiber, for repeating signal light, said optical repeater comprising:
optical amplifying means including an optical amplifying fiber doped with at least erbium, said optical amplifying fiber having an input end for inputting thereinto said signal light and an output end for outputting said signal light after its amplification and being excited to a high energy state by pump light to amplify said signal light;
input coupling means for optically interconnecting said optical signal transmission fiber and said input end of said optical amplifying fiber to input said signal light from said optical signal transmission fiber into said optical amplifying fiber;
output coupling means for optically interconnecting said optical signal transmission fiber and said output end of said optical amplifying fiber to output said signal light amplified by said optical amplifying fiber to said optical transmission fiber;
optical dividing means for dividing said pump light supplied from the outside into first pump light and second pump light;
said input coupling means and said output coupling means including first pump light input means and second pump light input means for inputting said first pump light and said second pump light into said input end and said output end of said optical amplifying fiber, respectively; and
optical filter means provided in an optical path interconnecting said input coupling means and said output coupling means via said optical amplifying means for cutting off optical noise except the wavelength band of said signal light and the wavelength band of said pump light.

12. An optical repeater to be connected in series to an optical signal transmission fiber, for repeating signal light, said optical repeater comprising:
optical amplifying means including an optical amplifying fiber doped with at least erbium, said optical amplifying fiber having an input end for inputting thereinto said signal light and an output end for outputting said signal light after its amplification and being excited to a high energy state by pump light to amplify said signal light;
input coupling means for optically interconnecting said optical signal transmission fiber and said input end of said optical amplifying fiber to input said signal light from said optical signal transmission fiber into said optical amplifying fiber;
output coupling means for optically interconnecting said optical signal transmission fiber and said output end of said optical amplifying fiber to output said signal light amplified by said optical amplifying fiber to said optical transmission fiber;
optical dividing means for dividing said pump light supplied from the outside into first pump light and second pump light;
said input coupling means and said output coupling means including first pump light input means and second pump light input means for inputting said first pump light and said second pump light into said input end and said output end of said optical amplifying fiber, respectively;

said optical amplifying means being divided into two substantially at the center thereof, and bandpass optical filter means which passes therethrough the wavelength band of said signal light and the wavelength band of said pump light but cuts off other optical noise, said optical filter means being provided between said two divided optical amplifying means.

13. An optical repeater to be connected in series to an optical signal transmission fiber, for repeating signal light, said optical repeater comprising:

optical amplifying means including an optical amplifying fiber doped with at least erbium, said optical amplifying fiber having an input end for inputting thereinto said signal light and an output end for outputting said signal light after its amplification and being excited to a high energy state by pump light to amplify said signal light;

input coupling means for optically interconnecting said optical signal transmission fiber and said input end of said optical amplifying fiber to input said signal light from said optical signal transmission fiber into said optical amplifying fiber;

output coupling means for optically interconnecting said optical signal transmission fiber and said output end of said optical amplifying fiber to output said signal light amplified by said optical amplifying fiber to said optical transmission fiber;

optical dividing means for dividing said pump light supplied from the outside into first pump light and second pump light;

said input coupling means and said output coupling means including first pump light input means and second pump light input means for inputting said first pump light and said second pump light into said input end and said output end of said optical amplifying fiber, respectively;

said signal light containing a plurality of multiplexed optical signals of different wavelengths, and said output coupling means including: optical demultiplexing means whereby said signal light output from said output end of said optical amplifying means after being amplified is demultiplexed into said plurality of optical signals; a plurality of optical attenuators for attenuating the levels of said demultiplexed optical signals to desired values; and optical multiplexing means for multiplexing said optical signals from said optical attenuators and providing them on said optical signal transmission fiber.

14. An optical repeater to be connected in series to an optical signal transmission fiber, for repeating signal light, said optical repeater comprising:

optical amplifying means including an optical amplifying fiber doped with at least erbium, said optical amplifying fiber having an input end for inputting thereinto said signal light and an output end for outputting said signal light after its amplification and being excited to a high energy state by pump light to amplify said signal light;

input coupling means for optically interconnecting said optical signal transmission fiber and said input end of said optical amplifying fiber to input said signal light from said optical signal transmission fiber into said optical amplifying fiber;

output coupling means for optically interconnecting said optical signal transmission fiber and said output end of said optical amplifying fiber to output said signal light amplified by said optical amplifying fiber to said optical transmission fiber;

optical dividing means for dividing said pump light supplied from the outside into first pump light and second pump light;

said input coupling means and said output coupling means including first pump light input means and second pump light input means for inputting said first pump light and said second pump light into said input end and said output end of said optical amplifying fiber, respectively;

said signal light containing a plurality of multiplexed optical signals of different wavelengths, and said output coupling means including: first coupling means having a first port into which is input said signal light output from said output end of said optical amplifying means after being amplified, a plurality of second ports which form optical paths between them and said first port for respective ones of said plurality of optical signals contained in said signal light, and a third port which forms an optical path between it and said first port for said pump light; a plurality of optical attenuators whereby the levels of said plurality of optical signals output from said plurality of second ports are attenuated to desired values; second coupling means having a plurality of fourth ports into which said plurality of optical signals are input from said plurality of optical attenuators, a fifth port which forms optical paths between it and said plurality of fourth ports for respective ones of said plurality of optical signals, and a sixth port which forms an optical path between it and said fifth port for said pump light; and optical bypass means interconnecting said third port and said sixth port for said pump light.

15. An optical repeater to be connected in series to an optical signal transmission fiber, for repeating signal light, said optical repeater comprising:

optical amplifying means including an optical amplifying fiber doped with at least erbium, said optical amplifying fiber having an input end for inputting thereinto said signal light and an output end for outputting said signal light after its amplification and being excited to a high energy state by pump light to amplify said signal light;

input coupling means for optically interconnecting said optical signal transmission fiber and said input end of said optical amplifying fiber to input said signal light from said optical signal transmission fiber into said optical amplifying fiber;

output coupling means for optically interconnecting said optical signal transmission fiber and said output end of said optical amplifying fiber to output said signal light amplified by said optical amplifying fiber to said optical transmission fiber;

optical dividing means for dividing said pump light supplied from the outside into first pump light and second pump light;

said input coupling means and said output coupling means including first pump light input means and second pump light input means for inputting said first pump light and said second pump light into said input end and said output end of said optical amplifying fiber, respectively;

and said output coupling means including unidirectional isolator means which passes therethrough said signal light from said optical amplifying means only in its direction of transmission.

16. The optical repeater of claim 15 wherein said outer coupling means further includes: first coupling means having a first port which is supplied with said signal light from said output end of said optical amplifying means, a second port which forms an optical path between it and said first port for only said signal light and provides said signal light to said isolator means via said optical path, and a third port which forms an optical path between it and said first port for only said pump light; second coupling means having a fourth port which is supplied with said signal light from said isolator means, a fifth port which forms an optical path between it and said fourth port for only said signal light and provides said signal light to said optical signal transmission fiber via said optical path, and a sixth port which forms an optical path between it and said fifth port for only said pump light; and bypass means interconnecting said third port of said coupling means and said sixth port of said second coupling means for said pump light.

17. An optical network comprising:
an optical cable containing an optical signal transmission fiber which connects at least two terminals and transmits therebetween signal light of a predetermined wavelength;
at least one optical repeater means inserted in series to said optical signal transmission fiber between said two terminals; and,
pump light supply means for supplying pump light to said optical repeater means from the outside thereof;
wherein said optical repeater means includes:
optical amplifying fiber doped with at least one rare earth element, said optical amplifying fiber having an input end for inputting thereinto said signal light and an output end for outputting therefrom amplified signal light and being excited to a high energy state by said pump light to amplify said signal light;
input coupling means for optically coupling said optical signal transmission fiber and said input end of said optical amplifying fiber to input said signal light from said optical signal transmission fiber into said optical amplifying fiber;
output coupling means for optically coupling said optical signal transmission fiber and said output end of said optical amplifying fiber to output said signal light amplified by said optical amplifying fiber to said optical signal transmission fiber;
pump light input means for inputting said pump light into said optical amplifying fiber via at least one of said input coupling means and said output coupling means of said optical repeater means, said pump light input means including pump light source means provided in at least one of said two terminals remote from said optical repeater means for generating said pump light, and pump light transmission fiber means which interconnects said pump light source means and said pump light input means to transmit said pump light from said pump light source means;
said signal light containing a plurality of multiplexed optical signals of different wavelengths, and said output coupling means of said optical repeater means including: optical demultiplexing means whereby said signal light output from said output end of said optical amplifying fiber after being amplified is demultiplexed into said plurality of optical signals; a plurality of optical attenuators for attenuating the levels of said demultiplexed optical signals to desired values; and optical multiplexing means for multiplexing said optical signals from said optical attenuators and providing them on said optical signal transmission fiber.

18. An optical network comprising:
an optical cable containing an optical signal transmission fiber which connects at least two terminals and transmits therebetween signal light of a predetermined wavelength;
at least one optical repeater means inserted in series to said optical signal transmission fiber between said two terminals; and,
pump light supply means for supplying pump light to said optical repeater means from the outside thereof;
wherein said optical repeater means includes:
optical amplifying fiber doped with at least one rare earth element, said optical amplifying fiber having an input end for inputting thereinto said signal light and an output end for outputting therefrom amplified signal light and being excited to a high energy state by said pump light to amplify said signal light;
input coupling means for optically coupling said optical signal transmission fiber and said input end of said optical amplifying fiber to input said signal light from said optical signal transmission fiber into said optical amplifying fiber;
output coupling means for optically coupling said optical signal transmission fiber and said output end of said optical amplifying fiber to output said signal light amplified by said optical amplifying fiber to said optical signal transmission fiber;
pump light input means for inputting said pump light into said optical amplifying fiber via at least one of said input coupling means and said output coupling means of said optical repeater means, said pump light input means including pump light source means provided in at least one of said two terminals remote from said optical repeater means for generating said pump light, and pump light transmission fiber means which interconnects said pump light source means and said pump light input means to transmit said pump light from said pump light source means;
said pump light source means being provided in at least one of said two terminals, said optical signal transmission fiber serving also as said pump light supply means and including coupler means for inputting said pump light from said pump light source means into said optical signal transmission fiber, and said pump light means of said optical repeater means serving also as at least one of said input coupling means and said output coupling means;
said signal light containing a plurality of multiplexed optical signals of different wavelengths, and said output coupling means including: first coupling means having a first port into which is input said signal light output from said output end of said optical amplifying fiber after being amplified, a plurality of second ports which form optical paths between them and said first port for respective ones of said plurality of optical signals contained in said signal light, and a third port which forms an optical path between it and said first port for said pump light; a plurality of optical attenuators whereby the levels of said plurality of optical signals output from said plurality of second ports are attenuated to desired values; second coupling means having a plurality of fourth ports into which said plurality of optical signals are input from said plurality of optical attenuators, a fifth port which forms optical paths between it and said plurality of fourth ports for respective ones of said plurality of optical signals, and a sixth port which forms an optical path between it and said fifth port for said pump light; and optical bypass means interconnecting said third and sixth ports for said pump light.

19. An optical network comprising:

an optical cable containing an optical signal transmission fiber which connects at least two terminals and transmits therebetween signal light of a predetermined wavelength;

at least one optical repeater means inserted in series to said optical signal transmission fiber between said two terminals; and, pump light supply means for supplying pump light to said optical repeater means from the outside thereof;

wherein said optical repeater means includes:

optical amplifying fiber doped with at least one rare earth element, said optical amplifying fiber having an input end for inputting thereinto said signal light and an output end for outputting therefrom amplified signal light and being excited to a high energy state by said pump light to amplify said signal light;

input coupling means for optically coupling said optical signal transmission fiber and said input end of said optical amplifying fiber to input said signal light from said optical signal transmission fiber into said optical amplifying fiber;

output coupling means for optically coupling said optical signal transmission fiber and said output end of said optical amplifying fiber to output said signal light amplified by said optical amplifying fiber to said optical signal transmission fiber;

pump light input means for inputting said pump light into said optical amplifying fiber via at least one of said input coupling means and said output coupling means of said optical repeater means, said pump light input means including pump light source means provided in at least one of said two terminals remote from said optical repeater means for generating said pump light, and pump light transmission fiber means which interconnects said pump light source means and said pump light input means to transmit said pump light from said pump light source means;

said optical repeater means comprising at least two optical repeaters inserted in series with said optical signal transmission fiber at at least two different places, said pump light source means being provided in at least one of said two terminals, said optical signal transmission fiber serving also as said pump light transmission fiber means, and said pump light supplying means including coupler means for optically coupling said pump light from said pump light source means to said optical signal transmission fiber to supply said pump light to a first one of said optical repeaters, and pump light coupling means for optically coupling one portion of said pump light to said optical signal transmission fiber between said first optical repeater and a second one of said optical repeaters to provide said one portion of said pump light to said second optical repeater, said pump light input means of said first and second optical repeaters serving also as at least one of said input coupling means and said output coupling means;

said signal light containing a plurality of multiplexed optical signals of different wavelengths, and said output coupling means including: first coupling means having a first port into which is input said signal light output from said output end of said optical amplifying fiber after being amplified, a plurality of second ports which form optical paths between them and said first port for respective ones of said plurality of optical signals contained in said signal light, and a third port which forms an optical path between it and said first port for said pump light; a plurality of optical attenuators whereby the levels of said plurality of optical signals output from said plurality of second ports are attenuated to desired values; second coupling means having a plurality of fourth ports into which said plurality of optical signals are input from said plurality of optical attenuators, a fifth port which forms optical paths between it and said plurality of fourth ports for respective ones of said plurality of optical signals, and a sixth port which forms an optical path between it and said fifth port for said pump light; and optical bypass means interconnecting said third and sixth ports for said pump light.

20. An optical network comprising:

an optical cable containing an optical signal transmission fiber which connects at least a transmitting terminal and a receiving terminal and transmits therebetween signal light of a predetermined wavelength;

at least one optical repeater means inserted in series to said optical signal transmission fiber between said two terminals at a location closer to said receiving terminal than to said transmitting terminal and yet remotely away from said receiving terminal; and pump light supply means for supplying pump light to said optical repeater means from the outside thereof;

said optical repeater means including optical amplifying fiber doped with at least one rare earth element, said optical amplifying fiber having an input end for inputting thereinto said signal light and an output end for outputting therefrom amplified signal light and being excited to a high energy state by said pump light to amplify said signal light, input coupling means for optically coupling said optical signal transmission fiber and said input end of said optical amplifying fiber to input said signal light from said optical signal transmission fiber into said optical amplifying fiber, output coupling means for optically coupling said optical signal transmission fiber and said output end of said optical amplifying fiber to output said signal light amplified by said optical amplifying fiber to said optical signal transmission fiber, and pump light input means for inputting said pump light into said optical amplifying fiber via at least one of said input coupling means and said output coupling means of said optical repeater means; and said pump light supply means including pump light source means provided in said receiving terminals for generating said pump light, and pump light transmission fiber means which interconnects said pump light source means and said pump light input means to transmit said pump light from said pump light source means.

21. The optical network of claim 20 wherein said pump light transmission fiber means is provided in said optical cable.

22. The optical network of claim 20 wherein said optical signal transmission fiber serves also as said pump light transmission fiber means, said pump light supply means including coupler means for inputting said pump light from said pump light source means into said optical sign transmission fiber, and said pump light input means of said optical repeater means serving also as at least one of said input coupling means and said output coupling means.

23. The optical network of claim 20 including:
a further optical repeater means inserted in series to said optical signal transmission fiber between said transmitting terminal and said optical repeater means; and
a further pump light supply means for supplying pump light to said further optical repeater means from the outside thereof;
said further optical repeater means including further optical amplifying fiber doped with at least one rare earth element and having an input end for inputting thereinto said signal light and an output end for outputting therefrom amplified signal light, said further optical amplifying fiber being excited to a high energy state by said pump light to amplify said signal light, further input coupling means for optically coupling said optical signal transmission fiber and said input end of said further optical amplifying fiber to input said signal light from said optical signal transmission fiber into said further optical amplifying fiber, further output coupling means for optically coupling said optical signal transmission fiber and said output end of said further optical amplifying fiber to output said signal light amplified by said further optical amplifying fiber to said optical signal transmission fiber, and further pump light input means for inputting said pump light from said further pump light supply means into said further optical amplifying fiber via at least one of said input coupling means and said output coupling means of said further optical repeater means;
said further pump light supply means including further pump light source means provided at a place different from the locations of said transmitting terminal and said receiving terminal for generating said pump light, and pump light transmission cable having installed therein a further pump light transmission fiber means which interconnects said further pump light source means and said further pump light input means for transmitting said pump light from said further pump light source means to said further optical amplifying fiber.

* * * * *